United States Patent
Tetelbaum et al.

(10) Patent No.: US 6,594,807 B1
(45) Date of Patent: Jul. 15, 2003

(54) METHOD FOR MINIMIZING CLOCK SKEW FOR AN INTEGRATED CIRCUIT

(75) Inventors: Alexander Tetelbaum, Hayward, CA (US); Rajiv Kapur, Menlo Park, CA (US)

(73) Assignee: LSI Logic Corporation, Milpitas, CA (US)

( * ) Notice: Subject to any disclaimer, the term of this patent is extended or adjusted under 35 U.S.C. 154(b) by 66 days.

(21) Appl. No.: 09/800,532

(22) Filed: Mar. 6, 2001

(51) Int. Cl.[7] .................................................. G06F 9/45
(52) U.S. Cl. .................................. 716/6; 716/10; 716/16
(58) Field of Search .......................... 716/5, 6, 10, 16; 327/161, 160; 326/16, 17

(56) References Cited

U.S. PATENT DOCUMENTS

| | | | |
|---|---|---|---|
| 5,394,024 A | * | 2/1995 | Buckenmaier et al. ...... 327/160 |
| 5,557,779 A | * | 9/1996 | Minami .......................... 716/6 |
| 5,578,938 A | * | 11/1996 | Kazami ......................... 326/16 |
| 5,600,568 A | * | 2/1997 | Iwakura et al. ................. 716/6 |
| 5,767,720 A | * | 6/1998 | Osera et al. ................. 327/161 |
| 5,923,570 A | * | 7/1999 | Shigemoto .................... 716/16 |
| 6,266,803 B1 | * | 7/2001 | Scherer et al. ................ 716/10 |
| 6,425,114 B1 | * | 7/2002 | Chan et al. ..................... 716/6 |
| 2002/0073389 A1 | * | 6/2002 | Elboim et al. .................. 716/6 |

* cited by examiner

Primary Examiner—Matthew Smith
Assistant Examiner—Binh C Tat
(74) Attorney, Agent, or Firm—Fitch, Even, Tabin & Flannery

(57) ABSTRACT

A method for synchronizing clock pulses for an integrated circuit includes the steps of (a) finding a relative delay with respect to a clock signal for a plurality of circuit elements and (b) inserting a delay cell between the clock signal and each of the plurality of circuit elements for each of the plurality of circuit elements wherein the delay cell has a relative delay greater than a minimum delay to minimize clock skew.

7 Claims, 4 Drawing Sheets

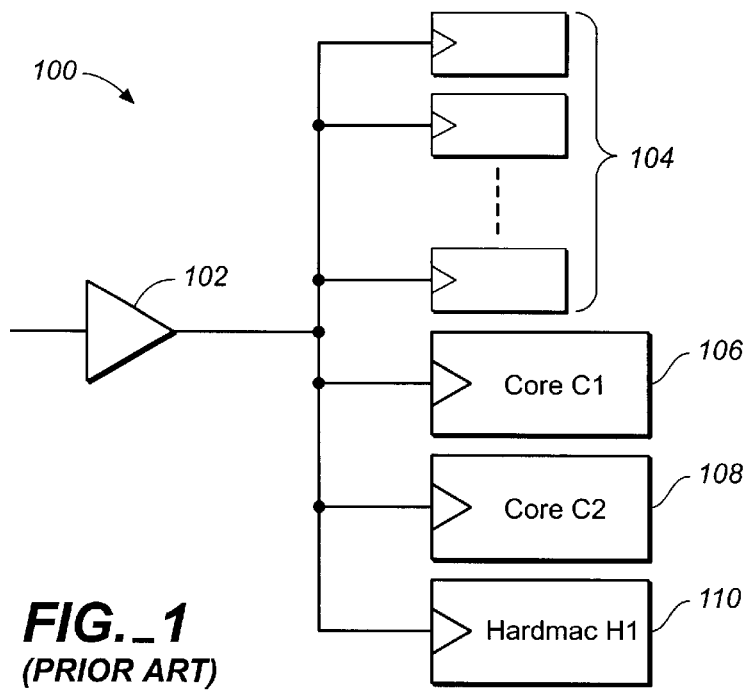
FIG._1
(PRIOR ART)
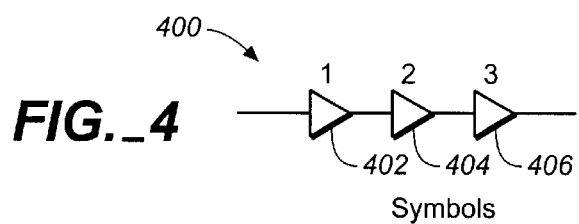
FIG._4
Symbols
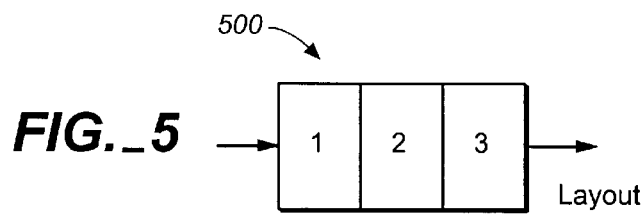
FIG._5
Layout

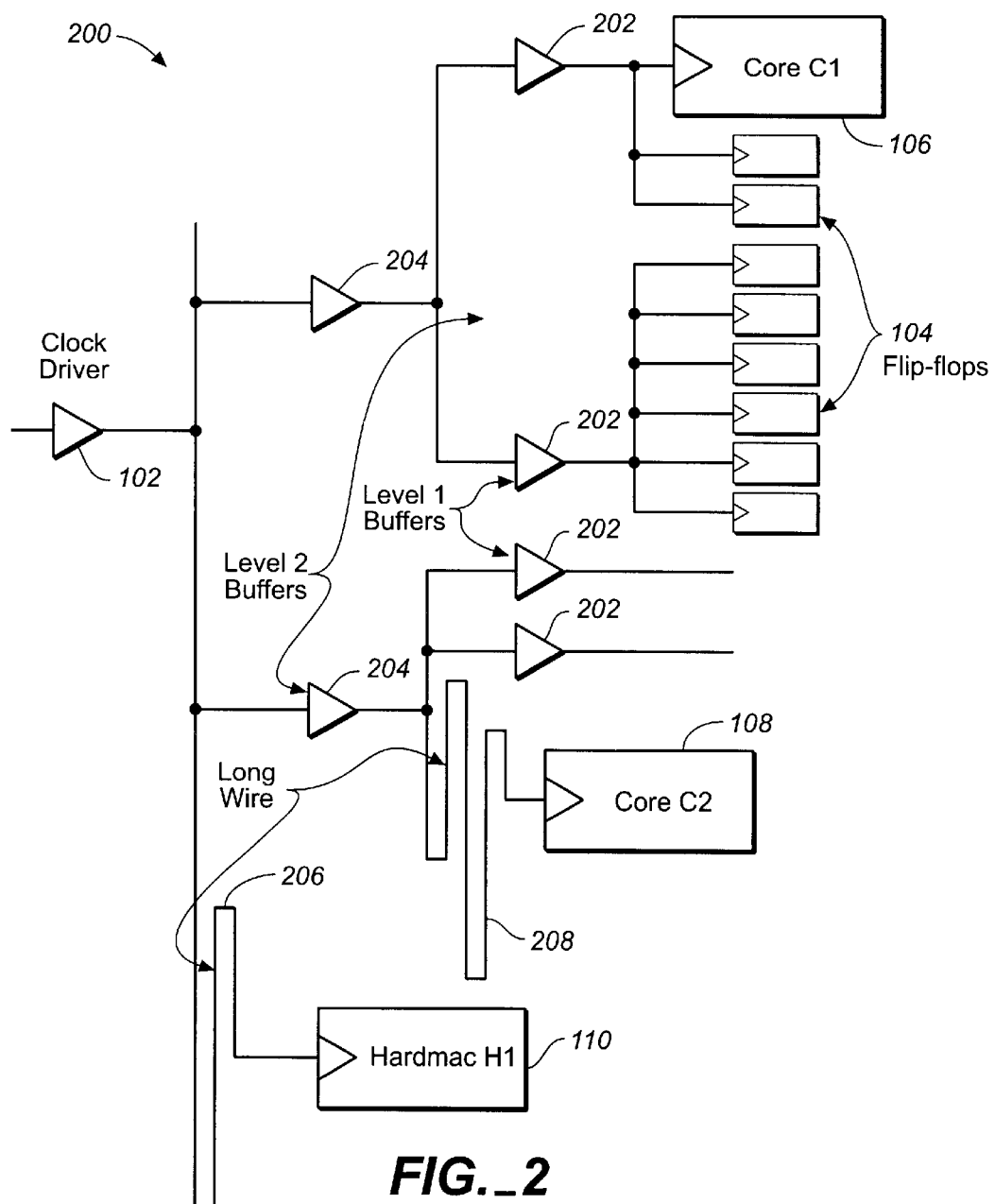
FIG._2
*(PRIOR ART)*

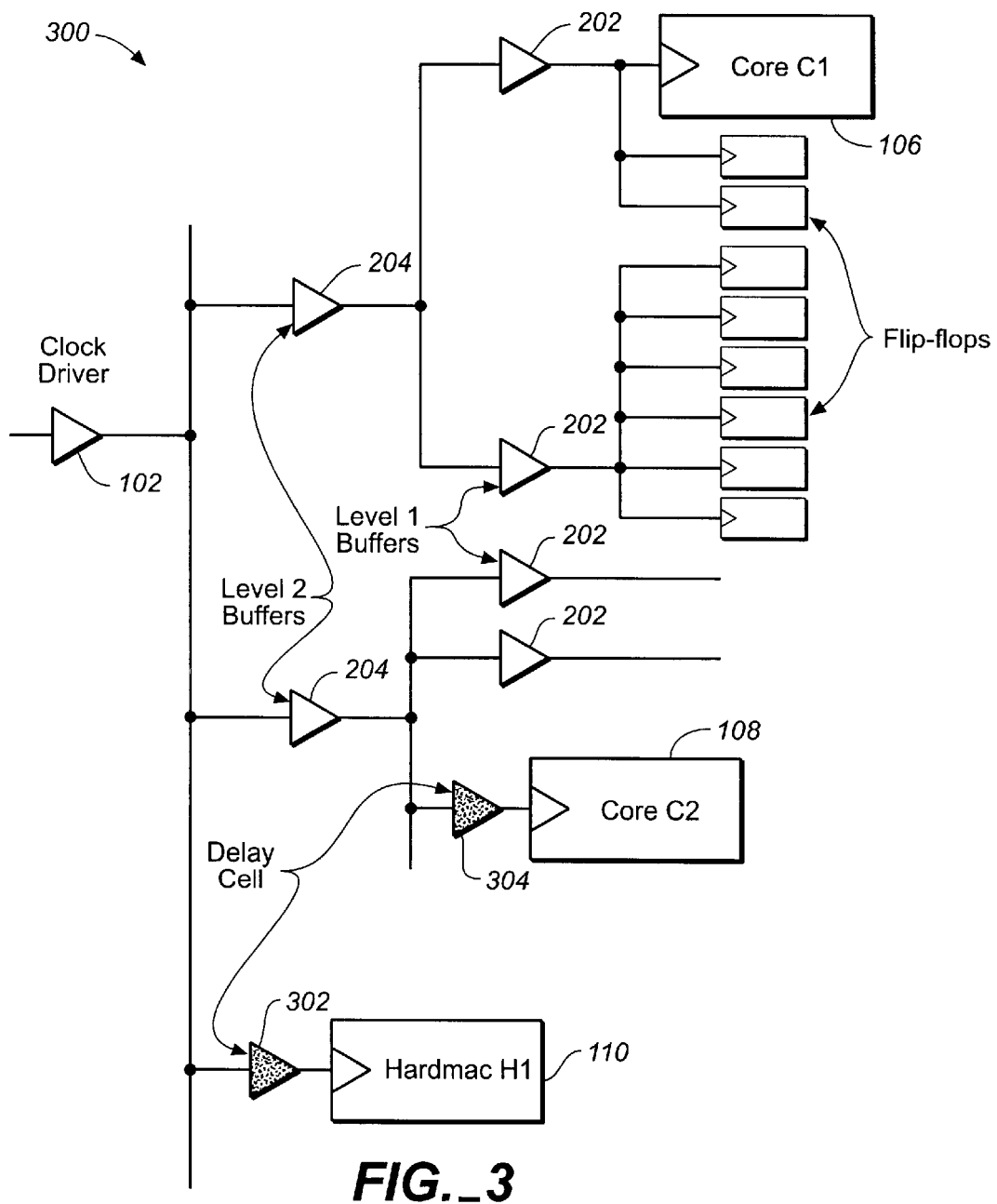
FIG._3

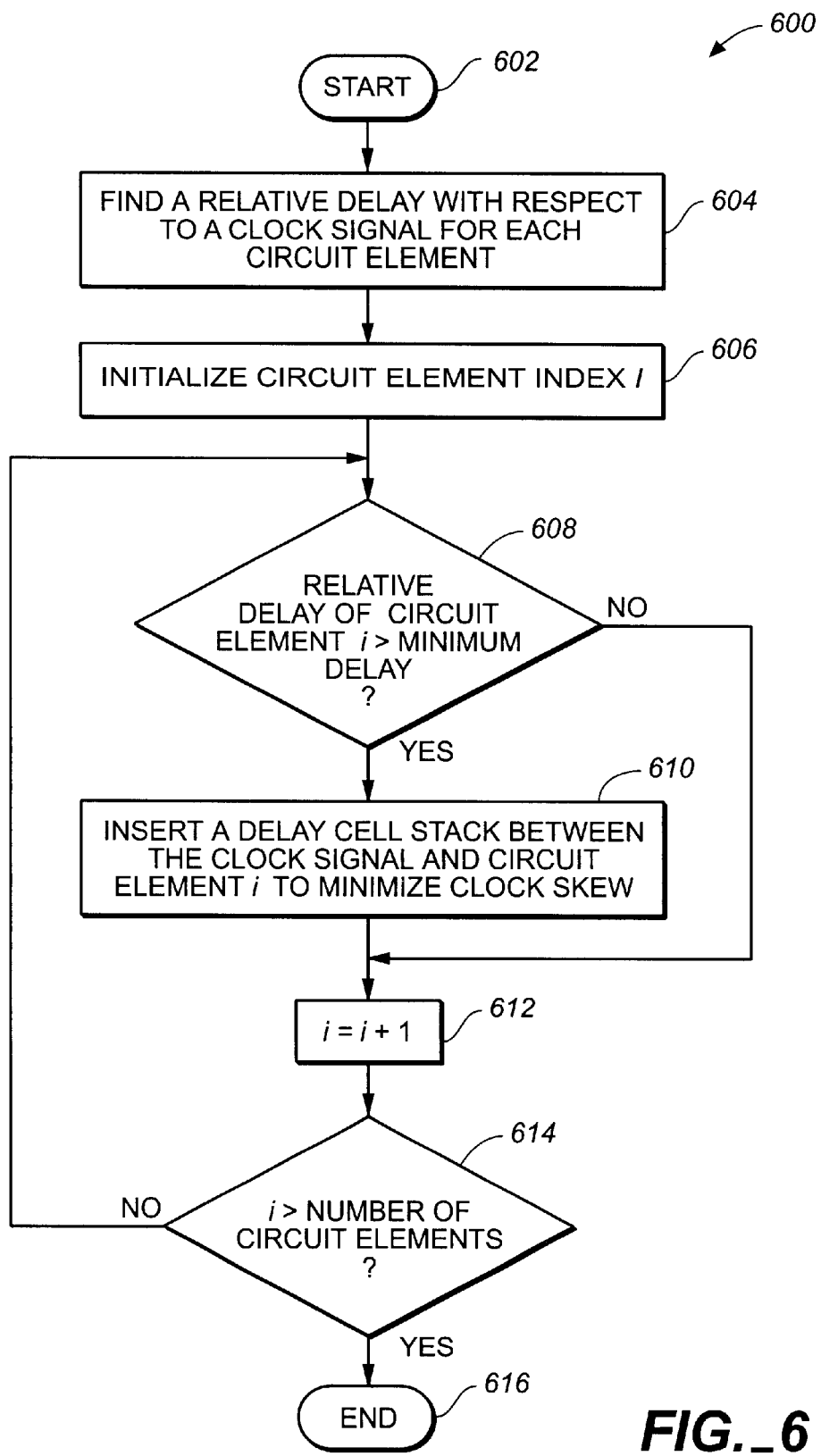
FIG._6

METHOD FOR MINIMIZING CLOCK SKEW FOR AN INTEGRATED CIRCUIT

BACKGROUND OF THE INVENTION

The present invention relates to synchronizing clock pulses among layout blocks of an integrated circuit. More specifically, but without limitation thereto, the present invention relates to inserting a minimum set of delay cells between a clock driver and each circuit element to synchronize clock pulses in an integrated circuit.

An integrated circuit chip design typically includes a hierarchy of layout blocks, or hard macros ("hardmacs"). These circuit elements generally require a common clock pulse to synchronize their operation with one another. Because the wire length between a clock pulse generator and each circuit varies, the propagation delays in the wiring also vary. The clock pulses arrive at each circuit element at a different time due to the propagation delays in the wiring. This variation in propagation time of the clock pulses to each of the circuit elements is called clock skew. In high speed circuits, clock skew of 100 picoseconds may cause a malfunction in the chip.

Current methods for correcting clock skew add compensating lengths of wire to balance the propagation delays. A disadvantage of these methods is that the increased wire length increases capacitive coupling to other circuits and adds loading capacitance that may distort the clock pulse waveform.

SUMMARY OF THE INVENTION

The present invention advantageously addresses the problems above as well as other problems by providing a method for synchronizing clock pulses for an integrated circuit by a balanced clock tree with delay cells.

In one embodiment, the present invention may be characterized as a method for synchronizing clock pulses for an integrated circuit that includes the steps of (a) finding a relative delay with respect to a clock signal for a plurality of circuit elements and (b) inserting a delay cell between the clock signal and each of the plurality of circuit elements for each of the plurality of circuit elements that has a relative delay greater than a minimum delay to minimize clock skew.

BRIEF DESCRIPTION OF THE DRAWINGS

The above and other aspects, features and advantages of the present invention will be more apparent from the following more specific description thereof, presented in conjunction with the following drawings herein:

FIG. 1 is a diagram of a typical clock fanout for an integrated circuit design;

FIG. 2 is a diagram of a clock balancing tree of the prior art for the clock fanout of FIG. 1;

FIG. 3 is a diagram of a clock balancing tree for the clock fanout of FIG. 1 according to an embodiment of the present invention;

FIG. 4 is a diagram of delay symbols for the clock balancing tree of FIG. 3;

FIG. 5 is a diagram of a physical layout for the stack of delay cells of FIG. 4; and FIG. 6 is a flowchart of a method of minimizing clock skew for the clock balancing tree of FIG. 3.

Corresponding reference characters indicate corresponding elements throughout the several views of the drawings.

DETAILED DESCRIPTION OF THE DRAWINGS

The following description is presented to disclose the currently known best mode for making and using the present invention. The scope of the invention is defined by the claims.

FIG. 1 is a diagram of a typical clock fanout 100 for an integrated circuit design. Shown in FIG. 1 are a clock driver 102, random logic flip-flops 104, and hard macros 106, 108, and 110. The clock driver 102 outputs a clock pulse to each of the random logic flip-flops 104, and the hard macros 106, 108, and 110. The wire lengths and corresponding propagation delays between the clock driver 102 and each of the random logic flip-flops 104, the hard macros 106, 108, and 110 are generally different, resulting in a relative clock phase shift or clock skew that may cause the integrated circuit to malfunction. A method of the prior art for balancing propagation delays to minimize clock skew is illustrated in FIG. 2.

FIG. 2 is a diagram of a clock balancing tree 200 of the prior art for the clock fanout of FIG. 1. Shown in FIG. 2 are a clock driver 102, random logic flip-flops 104, hard macros 106, 108, and 110, level 1 buffers 202, level 2 buffers 204, and long wires 206 and 208. The level 1 buffers 202 and the level 2 buffers 204 reduce the total delay, improve the clock skew, and avoid degradation of the clock pulse waveform due to large fanout load.

The clock pulse output from the clock driver 102 is connected to the level 2 buffers 204 and by the long wire 206 to the hard macro 110. The long wire 206 has a length with a corresponding propagation delay selected to balance the delay between the clock driver 102 and each of the other circuit elements, i.e., the random logic flip-flops 104, and the hard macros 106 and 108.

The output of each of the level 2 buffers is connected to two of the level 1 buffers 202 and by the long wire 208 to the hard macro 108. The long wire 208 has a length with a corresponding propagation delay selected to balance the delay between the clock driver 102 and each of the other circuit elements, i.e., the random logic flip-flops 104 and the hard macro 106. Balancing the propagation delays to approximately the same value for each of the circuit elements removes the relative phase shift of the clock pulses output from the clock driver 102, thus minimizing clock skew.

A disadvantage of the method of FIG. 2 is that the long wires 206 and 208 may generate capacitive coupling and loading that may adversely affect the operation of the circuit elements to which they are connected as well as other circuit elements in close proximity to the long wires 206 and 208.

FIG. 3 is a diagram of a clock balancing tree 300 for the clock fanout of FIG. 1 that uses a minimum set of delays instead of long wires for balancing propagation delays. Shown in FIG. 3 are a clock driver 102, random logic flip-flops 104, hard macros 106, 108, and 110, level 1 buffers 202, level 2 buffers 204, and delay cells 302 and 304.

The delay cell 302 is inserted between the clock driver 102 and the hard macro 110 to generate a delay selected to balance the delay between the clock driver 102 and each of the other circuit elements, i.e., the random logic flip-flops 104, and the hard macros 106 and 108 to minimize clock skew.

Likewise, the delay cell 304 is inserted between the clock driver 102 and the hard macro 108 to generate a delay selected to balance the delay between the clock driver 102 and each of the other circuit elements, i.e., the random logic flip-flops 104 and the hard macro 106 to minimize clock skew. A delay cell may include multiple delay cells connected in series to form a stack as shown in FIG. 4.

FIG. 4 is a diagram of delay symbols 400 for the clock balancing tree of FIG. 3. Shown in FIG. 4 is a stack of three delay cells 402, 404, and 406 that generate a combined delay selected to minimize clock skew.

FIG. 5 is a diagram of a physical layout 500 for the stack of delay cells of FIG. 4. Shown in FIG. 5 are delay cells 402, 404, and 406. Each of the delay cells 402, 404, and 406 is preferably a member of a minimum set of delay cells that may be connected in various combinations to generate any delay within a delay range at a selected granularity. For example, for a delay range of 100 picoseconds to 1150 picoseconds, a minimum set of five delay cells may be used to generate any delay within the delay range in steps, or granularity, of 25 picoseconds using a stack of from one to four delay cells as shown in Table 1 below. In this example, the minimum delay is 100 picoseconds. If the delay required to minimize clock skew is less than one-half the minimum delay, i.e., 50 picoseconds, then no delay cells would be inserted. Smaller minimum delays may be used to suit specific applications. The five delays cells in this example are 100, 125, 150, 175, and 400 picoseconds, respectively. Table 1 may be extended to a wider delay range, however some delays are not realizable with four or fewer of the minimum set of delays used to illustrate this example.

TABLE 1

| TOTAL DELAY | STACK | # DELAY CELLS |
| --- | --- | --- |
| 100 | 100 | 1 |
| 125 | 125 | 1 |
| 150 | 150 | 1 |
| 175 | 175 | 1 |
| 200 | 100 + 100 | 2 |
| 225 | 100 + 125 | 2 |
| 250 | 100 + 150 | 2 |
| 275 | 100 + 175 | 2 |
| 300 | 100 + 100 + 100 | 3 |
| 325 | 100 + 100 + 125 | 3 |
| 350 | 100 + 100 + 150 | 3 |
| 375 | 100 + 100 + 175 | 3 |
| 400 | 400 | 1 |
| 425 | 100 + 100 + 100 + 125 | 4 |
| 450 | 100 + 100 + 100 + 150 | 4 |
| 475 | 100 + 100 + 100 + 175 | 4 |
| 500 | 400 + 100 | 2 |
| 525 | 400 + 125 | 2 |
| 550 | 400 + 150 | 2 |
| 575 | 400 + 175 | 2 |
| 600 | 400 + 100 + 100 | 3 |
| 625 | 400 + 100 + 125 | 3 |
| 650 | 400 + 100 + 150 | 3 |
| 675 | 400 + 100 + 175 | 3 |
| 700 | 400 + 100 + 100 + 100 | 4 |
| 725 | 400 + 100 + 100 + 125 | 4 |
| 750 | 400 + 100 + 100 + 150 | 4 |
| 800 | 400 + 400 | 2 |
| 825 | 400 + 150 + 150 + 125 | 4 |
| 850 | 400 + 150 + 150 + 150 | 4 |
| 875 | 400 + 150 + 150 + 175 | 4 |
| 900 | 400 + 400 + 100 | 3 |
| 925 | 400 + 400 + 125 | 3 |
| 950 | 400 + 400 + 150 | 3 |
| 975 | 400 + 400 + 175 | 3 |
| 1000 | 400 + 400 + 100 + 100 | 4 |
| 1025 | 400 + 400 + 100 + 125 | 4 |
| 1050 | 400 + 400 + 100 + 150 | 4 |
| 1075 | 400 + 400 + 100 + 175 | 4 |
| 1100 | 400 + 400 + 150 + 150 | 4 |

TABLE 1-continued

| TOTAL DELAY | STACK | # DELAY CELLS |
| --- | --- | --- |
| 1125 | 400 + 400 + 150 + 175 | 4 |
| 1150 | 400 + 400 + 175 + 175 | 4 |

FIG. 6 is a flowchart 600 of a method of minimizing clock skew for the clock balancing tree of FIG. 3. Step 602 is the entry point for the flowchart 600. Step 604 finds a relative delay with respect to a clock signal for each circuit element for a plurality of circuit elements. Step 606 initializes a circuit element index i. Step 608 checks whether the relative delay of circuit element i is greater than a minimum delay. If yes, then step 610 inserts a delay cell stack between the clock signal and circuit element i to minimize clock skew. If no, control transfers to step 612. Step 612 increments the circuit element index i. Step 614 checks whether i exceeds the number of circuit elements. If no, control transfers to step 608. If yes, control transfers to step 616. Step 616 is the exit point for the flowchart 600.

Using standard delay cells instead of long wires by the method described above simplifies the layout of integrated circuit designs and greatly reduces unwanted coupling signals between interconnects.

While the invention herein disclosed has been described by means of specific embodiments and applications thereof, other modifications, variations, and arrangements of the present invention may be made in accordance with the above teachings other than as specifically described to practice the invention within the spirit and scope defined by the following claims.

What is claimed is:

1. A method for synchronizing clock pulses for an integrated circuit comprising the steps of:
   (a) finding a relative delay with respect to a clock signal for a plurality of circuit elements; and
   (b) for each of the plurality of circuit elements for which the relative delay exceeds a selected minimum delay, inserting at least one of a minimum set of delay cells between the clock signal and each of the plurality of circuit elements for which the relative delay exceeds the selected minimum delay wherein the minimum set of delay cells has a selected granularity within a delay range and wherein the at least one of the minimum set of delay cells has a delay within the delay range selected to minimize clock skew wherein the minimum delay is 50 picoseconds.

2. A method for synchronizing clock pulses for an integrated circuit comprising the steps of:
   (a) finding a relative delay with respect to a clock signal for a plurality of circuit elements; and
   (b) for each of the plurality of circuit elements for which the relative delay exceeds a selected minimum delay, inserting at least one of a minimum set of delay cells between the clock signal and each of the plurality of circuit elements for which the relative delay exceeds the selected minimum delay wherein the minimum set of delay cells has a selected granularity within a delay range and wherein the at least one of the minimum set of delay cells has a delay within the delay range selected to minimize clock skew wherein the minimum set of delay cells comprises five delay cells having different respective delays wherein one or more of the five delay cells may be connected to generate every delay within the delay range.

3. A method for synchronizing clock pulses for an integrated circuit comprising the steps of:
  (a) finding a relative delay with respect to a clock signal for a plurality of circuit elements; and
  (b) for each of the plurality of circuit elements for which the relative delay exceeds a selected minimum delay, inserting at least one of a minimum set of delay cells between the clock signal and each of the plurality of circuit elements for which the relative delay exceeds the selected minimum delay wherein the minimum set of delay cells has a selected granularity within a delay range and wherein the at least one of the minimum set of delay cells has a delay within the delay range selected to minimize clock skew wherein the minimum set of delay cells includes delay cells having-respective delays of 100 picoseconds, 125 picoseconds, 150 picoseconds, 175 picoseconds, and 400 picoseconds.

4. A method for synchronizing clock pulses for an integrated circuit comprising the steps of:
  (a) finding a relative delay with respect to a clock signal for a Plurality of circuit elements; and
  (b) for each of the plurality of circuit elements for which the relative delay exceeds a selected minimum delay, inserting at least one of a minimum set of delay cells between the clock signal and each of the plurality of circuit elements for which the relative delay exceeds the selected minimum delay wherein the minimum set of delay cells has a selected granularity within a delay range and wherein the at least one of the minimum set of delay cells has a delay within the delay range selected to minimize clock skew wherein the selected granularity is 25 picoseconds.

5. A method for synchronizing clock pulses for an integrated circuit comprising the steps of:
  (a) finding a relative delay with respect to a clock signal for a plurality of circuit elements; and
  (b) for each of the Plurality of circuit elements for which the relative delay exceeds a selected minimum delay, inserting at least one of a minimum set of delay cells between the clock signal and each of the plurality of circuit elements for which the relative delay exceeds the selected minimum delay wherein the minimum set of delay cells has a selected granularity within a delay range and wherein the at least one of the minimum set of delay cells has a delay within the delay range selected to minimize clock skew wherein the delay range is from 100 picoseconds to 1150 picoseconds.

6. A method for synchronizing clock pulses for an integrated circuit comprising the steps of:
  (a) finding a relative delay with respect to a clock signal for a plurality of circuit elements: and
  (b) for each of the plurality of circuit elements for which the relative delay exceeds a selected minimum delay, inserting at least one of a minimum set of delay cells between the clock signal and each of the plurality of circuit elements for which the relative delay exceeds the selected minimum delay wherein the minimum set of delay cells has a selected granularity within a delay range and wherein the at least one of the minimum set of delay cells has a delay within the delay range selected to minimize clock skew wherein any delay within the delay range may be generated having the selected granularity by a stack of no more than four delay cells.

7. The method of claim 6 wherein the circuit elements comprise a hard macro of an integrated circuit chip.

* * * * *